Jan. 2, 1940.  T. FLADMARK  2,185,912
NAUTICAL COURSE CORRECTOR
Filed Nov. 30, 1937

T. Fladmark
INVENTOR

By: Glascock Downing & Seebold
Attys.

Patented Jan. 2, 1940

2,185,912

UNITED STATES PATENT OFFICE 2,185,912

NAUTICAL COURSE CORRECTOR

Thor Fladmark, Aalesund, Norway

Application November 30, 1937, Serial No. 177,322
In Norway September 19, 1935

8 Claims. (Cl. 33—75)

The present invention relates to apparatus for marking on the chart bearings and the line of course sailed, as well as for reading off the course. Such apparatus includes a so-called course corrector of the kind consisting of a plate or disc provided with a circular opening, and a ring-shaped part mounted so as to rotate around said opening and having a part in the form of a segment or chord, the inward edge of which serves to guide a square or the like, placed in the open space under which is spread the portion of the chart which is being used. For the purpose of reading off the angular position of the ring in relation to the plate one of these parts is provided with a graduation scale, while the other is provided with at least one reading mark. By aid of the square the line of course can be laid off on the chart or the course read off.

When using a course corrector of this known construction the course marked off by means of the ruler, designated the true course, must first be corrected for variation, whereby the variation course is obtained, and afterwards for deviation, i. e. the error of the compass due to the magnetic conditions on board the ship, so that the deviation or compass course is obtained. Before bearings taken by compass can be marked on the chart correction in the reverse order must be made.

The present invention provides for an improvement in a course corrector of the kind above described, by means of which improvement the process of correction for variation and deviation can be simplified. According to the invention this is attained by introducing in known manner around the rotatable ring-shaped part another ring rotatable in relation to the plate and provided with a graduation scale, which ring can be adjusted in relation to the plate with due regard to the variation, while outside the graduated ring there is placed a section of a circular ring provided with a zero-mark and a graduation scale on each side thereof, which section can be adjusted both in relation to the plate and to the ring that bears the compass graduation scale. By means of this arc-shaped section regard can be paid to the deviation of the compass when marking off or reading off the course, so that by aid of the course corrector the compass course can be read direct, or, conversely, the line of course can be marked direct on the chart on the basis of a bearing taken.

A further and very important feature of the invention consists in the provision of means for reading simultaneously the variation course and the deviation course.

The invention includes a number of other features and advantages which will appear from the description hereinafter set forth with reference to the annexed drawing, which illustrates a preferred form of the invention.

Figure 1:
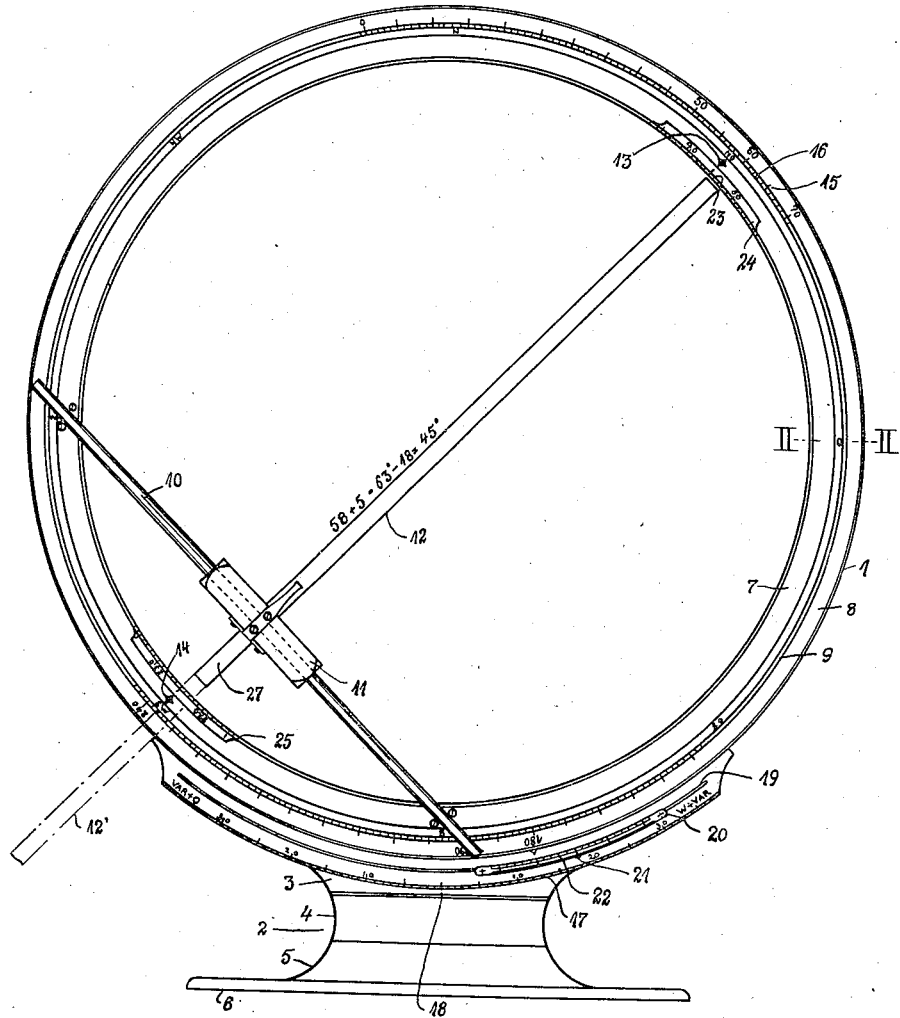
Fig. 1 shows on reduced scale a course corrector according to the invention, seen from above.

The course corrector in the form of execution shown in the drawing comprises three ring-shaped parts arranged to rotate in relation to each other, namely, an underlying part 1, made in the form of a circular ring with a foot-piece 2 composed of several parts 3, 4, 5 and 6, hinged together, as well as the two circular rings 7 and 8 rotatably mounted on the underlying plate. The ring 7 is made to have an internal diameter approximately equal to the inner diameter of the ring 1, while the ring 8 has an internal diameter somewhat greater than the external diameter of the ring 7 and an external diameter equal to the external diameter of the ring. The rings 7 and 8 are held fast upon the underlying plate 1 by means of a circular fillet 9 which is secured to the underlying plate by means of screws or fixed thereto in some other suitable manner and which is narrower below than above, while the edges of the rings 7 and 8, on the side adjoining the fillet, are bevelled in a manner corresponding to the slope of the fillet. All the rings may be made of light metal.

To the inner ring-shaped part 7 there is attached a guiding rod 10, bearing a slide member 11 to which is fastened a ruler 12. The construction of this ruler will be hereinafter described.

Figure 2:
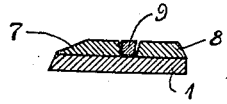
Fig. 2 shows on larger scale a detail section taken along line II—II in Fig. 1.
Figure 3:
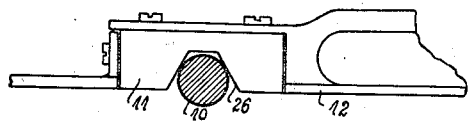
Fig. 3 shows the left-hand end of the ruler 12, seen from the left side in the position shown in Fig. 1.

The ring 7 is at diametrically opposite points provided with reading marks 13 and 14, by aid of which the angular position of the ring and thereby of the ruler 12 in relation to the underlying plate and to the outer ring 8 can be read by means of the compass scale on these parts. The ring 8 is provided with a compass scale 15, which in the form of execution shown in the drawing is composed of graduations arranged at intervals of 5, with the figures 0—10—20, etc., to 350. This compass scale 15 concurs with a scale 16 which is arranged on the upper side of the fillet 9 and is composed of lines at intervals of 1°, without special numbering for each 5th or 10th degree. The scales 15 and 16 constitute in practice, as will be understood, one graduation scale, which can, if desired, be placed in its entirety on the ring 8.

On the portion 3 of the foot-piece 2, which is made to form part of the underlying plate 1, there is arranged a variation scale 17, extending a suitable distance, say 30 or 40°, on each side of a 0-mark 18 which lies on a line running through the centre and standing perpendicular to the edge 6 of the foot-piece. Between the variation scale 17 and the ring 8 there is formed a groove 19 or a guiding channel, co-axial with the variation scale and the ring 8. In this groove a sliding adjustment member is arranged consisting of an arc-formed piece 20 which is provided with an adjustment mark 21 on the side facing towards the variation scale 17, as well as a graduation scale 22 which extends a suitable distance, say 10–15°, on each side of the adjustment mark 21 and which is placed on the side of the part 20 that faces the ring 8.

In order to facilitate a simultaneous reading of the true and the deviation course there is arranged along the inner circumference of the underlying plate 1 a complete compass scale 23. This scale 23 is for the most part covered by the ring 7, but becomes visible at two openings therein 24 and 25, extending a suitable distance on each side of the reading marks 13 and 14.

The course corrector according to the invention can be employed in combination with an ordinary set-square, moved along the guiding rod 10. In the form of execution shown in the drawing there is employed a specially constructed ruler 12, which is fixed to a block or slide member 11. This latter is, as will be seen from Fig. 3, constructed on the under-side with a groove 26, made with sloping side-walls to receive the rod 10. This form of construction involves the special advantage that the ruler can be lifted and moved round an arc of 180° and together with the slide 11 be brought into such position on the rod 10 that the ruler takes up the position indicated by the dotted lines 12' in Fig. 1. Thereby is rendered possible the reading of bearings from points lying outside the limits of the course corrector. The ruler has on the other side of the slide 11 a prolongation 27, so that also those points on the chart which lie between the rod 10 and the ring 7 can be used for the marking of course-lines.

As already mentioned, the foot-piece 2 is composed of several parts 3, 4, 5 and 6, which are hinged together. In general the course corrector is used with these parts in the position shown in Fig. 1. The part 6 is made comparatively long, while the parts 4 and 5 which lie between the part 6 and the underlying plate are narrower and take up a relatively small angle-space, so that the course corrector can be used in practically its entire circumference. The part 6 is intended to lie against a raised edge or border of a chart-table, but if it is desired to use the portion of the chart that lies nearest to this edge, the foot-piece can be folded up, so that the parts 4 and 5 occupy a vertical position.

The course corrector in accordance with the invention is to be used in the following manner:

Supposing it is desired to read off the compass course corresponding to a line of sailing laid down on the chart. In such case the sliding part 20 is with due regard to the variation adjusted so that the zero-mark 21 points to that point on the scale 17 which indicates the magnetic variation. In the situation shown on the drawing the magnetic variation is shown to be 18° W. Thereupon the ring 8 is adjusted in such manner that the scale line 180 points to that point on the scale 22 which answers to the deviation of the compass on the course laid. In the situation shown on the drawing the deviation is assumed to be —5°.

The course corrector is now placed on the chart with the open space over that part of the chart which is to be used and is laid in such manner that the edge 6 stands at right angles to the meridian line of the chart. The ring 7 is now turned until the diameter-line through the reading marks 13 and 14 runs parallel with the course line on the chart. This latter is determined in known manner by aid of the ruler 12, which can be moved along the guiding rod 10 to parallel positions.

In the example shown in the drawing the true course, corresponding to the direction of the diameter-line 13—14, is assumed to be 45°. The variation is, as stated, 18° W, while the deviation of the course laid is —5°. After the rings 7 and 8 have been properly adjusted the mark 13 points to the 58-line on the scale 15, 16. This is the course that is to be steered on the compass.

In order to find this course by aid of devices formerly employed it was necessary to add to the course reading (45°) the variation 18° and to deduct therefrom the deviation 5° (45+18—5=58).

As shown by the example illustrated in the drawing:

| Deviation course | Deviation | Variation course | Variation | True course |
| --- | --- | --- | --- | --- |
| Degrees 58 | Degrees +5 | Degrees 63 | Degrees —18 | Degrees 45 |

The course corrector acts as a calculating machine which for all the 360 bearings, when once it has been properly adjusted, automatically reduces all courses from the true course through the variation to the deviation course. In like manner all bearings are converted from the deviation via the variation to the true course. At the same time it is made possible to read off direct the figures for the true course and the deviation course, each on its own side of the reading mark.

That the extent of the deviation shall be read off direct is not only a necessity in the process of reduction and for the sake of control, but while one by means of the course corrector with use of three simultaneously taken bearings and by aid of the triangle thus obtained can arrive constructively at the right deviation, yet this procedure cannot be carried out in practice unless the deviation can easily be directly altered during the constructive process and unless its alternate increase and decrease and its plus and minus character can constantly be followed.

If the course corrector is to be employed in connection with a gyroscope compass, the same mode of procedure is adopted with regard to the deviation to which the compass is always subject, but in this case the arrangement for dealing with the variation is not employed.

In the form of construction shown in the drawing for the course corrector according to the invention the true course is read on the stationary scale 23 inside of the reading mark 13, while the deviation course is read outside of the same mark on the adjustable scale 15, 16. As will at once be understood, the apparatus can be modified in various ways within the scope of the invention and without departing from the fundamental idea therein. For instance, the ring 7 may be provided with a graduation scale running in opposite direction to the scales 15, 16 and 23, these latter being at the same time replaced by two reading marks corresponding to the zero points on the scales. The true course can then be read on the outer side of the scale opposite the reading mark on the stationary ring, while the deviation course can be read on the inner side of the scale opposite the reading mark on the adjustable ring.

The simultaneous reading of true and deviation course may also be accomplished in the following manner:

As in the apparatus shown in the drawing there is employed a stationary scale, corresponding to the scale 23. On this scale the true course can at once be read opposite a reading mark placed on the circular portion which bears the guiding rod for the ruler. The deviation course can be read on the same scale by aid of a reading mark which can be adjusted in relation to the circular portion with due regard both to variation and to deviation. The reading mark may, for example, be placed on a ring-shaped part which can be adjusted in the desired angular position in relation to the part bearing the guiding rod for the ruler, and the adjustment of these circular parts in relation to each other may be effected, for instance, by use of an adjusting member similar to the adjusting member 20 employed in the construction shown in the drawing.

I claim:

1. A course corrector of the kind described comprising, a disc provided with a circular opening, an annular member rotatably mounted on said disc around the opening, a member fixed to said annular member adapted to serve as guide for a ruler, a second annular member rotatably mounted on said disc and provided with a compass scale, a variation scale on the disc and an arc-shaped member movably mounted in peripheral direction on the disc between the variation scale and the second annular member, said arc-shaped member being provided with a zero mark and a graduated scale on each side of the zero mark.

2. A course corrector as claimed in claim 1, characterized by means for simultaneous reading of the true and deviation course.

3. A course corrector as claimed in claim 1, characterized by graduated scales from 0–360° arranged both on the disc and the second annular member by means of which scales the angular position of the firstnamed annular member in relation to each of the other parts can be read.

4. Course corrector as stated in claim 1, in which the disc is of annular shape and the annular member has an internal diameter approximately equal to the internal diameter of the disc, the other annular member having an internal diameter somewhat greater than the external diameter of the firstnamed annular member and an external diameter equal to the external diameter of the disc, and further comprising a circular fillet which is narrower below than above arranged between the annular members, the edges of the annular members on the side adjoining the fillet being bevelled in a manner corresponding to the slope of the fillet, said fillet being adapted to secure the annular members to the disc.

5. Course corrector of the kind described comprising a disc provided with a circular opening and a variation scale, and having further a graduated scale from 0–360° on its upper side along its inner circumference, an annular member rotatably mounted on said disc around the opening, said annular member covering the main part of the graduated scale and being provided with an opening extending on each side of an adjustment mark through which opening the position of the annular member in relation to the disc can be read, a member fixed to said annular member adapted to serve as guide for a set square, a second annular member rotatably mounted on said disc and provided with a compass scale, and an arc-shaped member movably mounted in peripheral direction on said disc between a variation scale on the same and the second annular member, said arc-shaped member being provided with a zero mark and a graduated scale on each side of the zero mark.

6. A course corrector as claimed in claim 1, in which the disc is of annular shape and the annular member has an internal diameter approximately equal to the internal diameter of the disc, the other annular member having an internal diameter somewhat greater than the external diameter of the firstnamed annular member and an external diameter equal to the external diameter of the disc, and further comprising a circular fillet which is narrower below than above arranged between the annular members, the edges of the annular members on the side adjoining the fillet being bevelled in a manner corresponding to the slope of the fillet, said fillet being adapted to secure the annular members to the disc, the compass scale on the second annular member having one graduation line for each 5th or 10th degree, with a graduation number, and the fillet is provided with a graduation line for each degree.

7. A course corrector as claimed in claim 1, wherein the guiding device consists of a rod running as a chord, on which rod is mounted a slide member to which is fastened a ruler.

8. A course corrector as claimed in claim 1, wherein the guiding device consists of a rod running as a chord, on which rod is mounted a slide member to which is fastened a ruler, said slide member being on its underside provided with a groove, having sloping side walls embracing the rod so that the ruler and the slide may be lifted from the rod and turned through an angle of 180° and again placed on the rod.

THOR FLADMARK.